United States Patent [19]

Seki et al.

[11] Patent Number: 5,317,357
[45] Date of Patent: May 31, 1994

[54] CAMERA DUAL SWITCH SINGLE DATA INPUT-MULTIPLE DATA OUTPUT DEVICE

[75] Inventors: Yoichi Seki; Teruyo Hayakawa; Hiroyuki Saito; Shinichi Endo, all of Yotsukaido, Japan

[73] Assignee: Seikosha Co., Ltd., Japan

[21] Appl. No.: 801,762

[22] Filed: Nov. 29, 1991

[51] Int. Cl.$^5$ .............................................. G03B 17/00
[52] U.S. Cl. ................................................ 354/289.12
[58] Field of Search ................................... 354/289.12

[56] References Cited

U.S. PATENT DOCUMENTS 4,437,752  3/1984  Akashi et al. .................. 354/289.12
4,523,827  6/1985  Masunaga et al. .................. 354/400

FOREIGN PATENT DOCUMENTS 1-149624  10/1989  Japan .
3-63833   3/1991   Japan .

Primary Examiner—Michael L. Gellner
Assistant Examiner—J. K. Han
Attorney, Agent, or Firm—Bruce I. Adams; Van C. Wilks

[57] ABSTRACT

A data input-output device for a camera comprises a data input interface having first and second switches for generating input data, first and second flip-flops for latching input data generated by opening and closing the first and second switches, a data converting circuit for converting the input data generated by opening and closing the first and second switches to digital data by a combination of the input data generated by opening and closing the first and second switches and of output data of the first and second flip-flops, a plurality of AND circuits in which the digital data converted by the data converting circuit is inputted, and a data output interface for outputting a plurality of digital data from AND logic obtained by the plurality of AND circuits. The device has the advantages of enabling a reduction in the number of terminals when manufactured as an IC, simplifies the pattern of a printed circuit board due to its simple random logic, and permits the mounting of the elements in high density.

18 Claims, 2 Drawing Sheets

CAMERA DUAL SWITCH SINGLE DATA INPUT-MULTIPLE DATA OUTPUT DEVICE

BACKGROUND OF THE INVENTION (2) Field of the Invention

The present invention relates to a data input-output device for a camera, and more particularly to a data input-output device for a camera that outputs data converted from input data generated by opening and closing two switches as a plurality of digital data by random logic.

(2) Description of the Related Art and Problems To Be Solved By the Invention

As disclosed in Japanese Utility Model Application Laid-Open No. 1-149624 entitled "Controller for Camera", both the input and output terminals of prior art data input-output devices for cameras are comprised of one terminal, respectively, and the binary states of each input and output terminal are controlled by a central processing unit (CPU).

In Japanese Patent Application No. 1-201613 entitled "Encoder Device", data taken out of mechanical elements decoded according to function is decoded as digital data by an A/D converting circuit built in a CPU.

The device described in the aforementioned Japanese Utility Model Application Laid-Open No. 1-149624 has the drawbacks that it only reduces the number of input ports for the CPU and that it cannot determine the state when both of two switches are closed.

The device described in Japanese Patent Application No. 1-201613 has the drawbacks that it requires an A/D converter of either the counter type or the double integral type, both of whose circuits are so complex that they cannot be used for fast data input/output of a camera and the like and which have a limited range of use.

SUMMARY OF THE INVENTION

In view of the drawbacks and disadvantages of the prior art described above, the main objects of the present invention are to provide a data input-output device for a camera which has a reduced number of terminals when manufactured as an IC, which produces output data converted from input data in accordance with the open and closed states of two switches on one input terminal as a plurality of digital data by random logic, which can be manufactured using a simplified pattern of a printed circuit board because it is based on simple random logic, and which enables mounting of the circuit elements in high density.

In order to achieve the aforementioned objects, the data input-output device for a camera of the present invention is comprised of first and second switches, first and second flip-flops for latching input data generated by opening and closing the first and second switches, data converting means for converting the input data to digital data by a combination of the input data generated by opening and closing the first and second switches and of output data of the first and second flip-flops, a plurality of AND circuits to which are inputted the digital data converted by the data converting means, and data output means for outputting a plurality of digital data from the AND logic obtained from the plurality of AND circuits.

BRIEF DESCRIPTION OF THE DRAWINGS

The drawings illustrate an exemplary embodiment of the present invention, in which.

DETAILED DESCRIPTION OF PREFERRED EMBODIMENT

Figure 1:
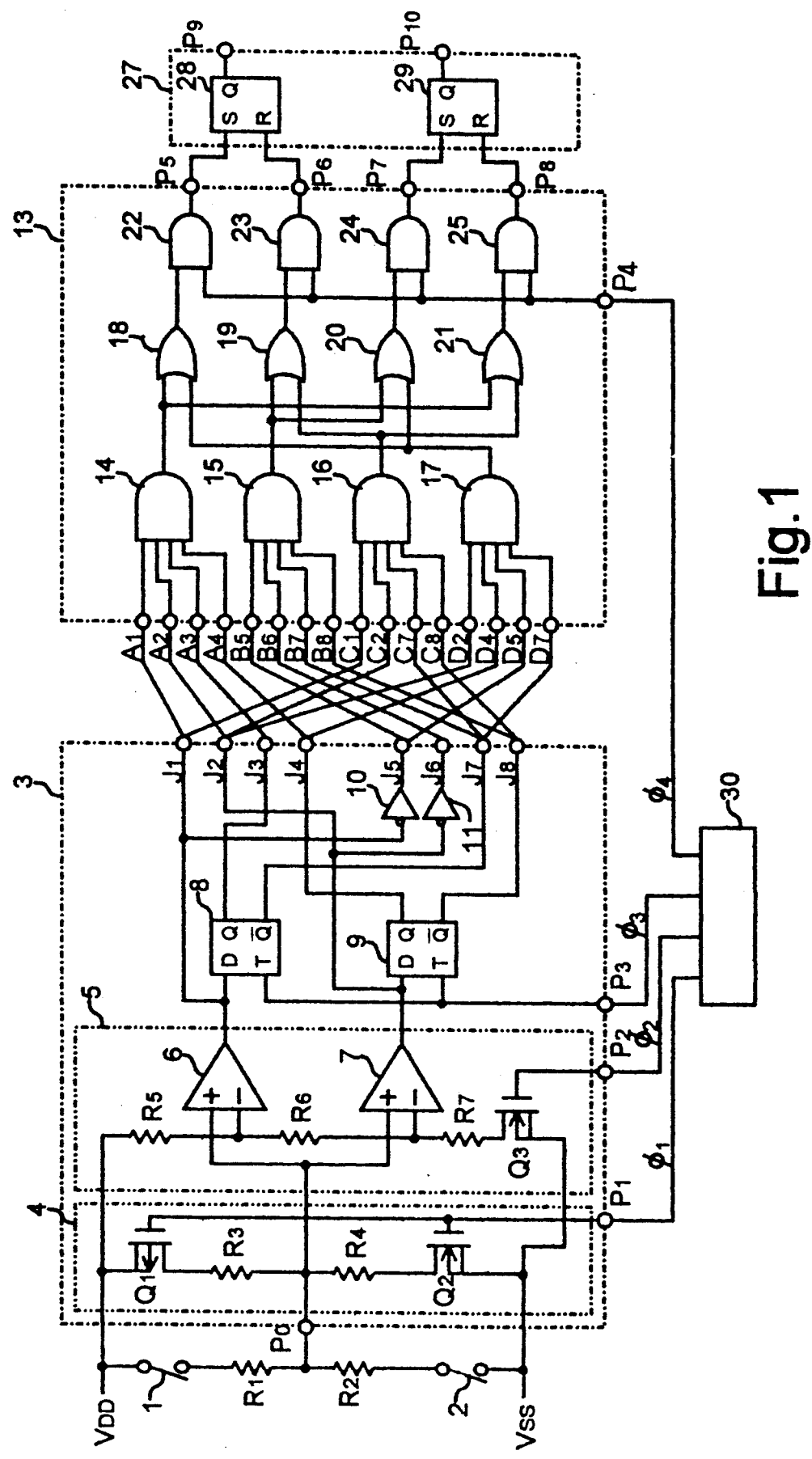
FIG. 1 is a block diagram showing one embodiment of a data input-output device for a camera according to the present invention.

Referring now to the drawings, one preferred embodiment of a data input-output device for a camera embodying the principles of the present invention will be explained in detail.

As shown in FIG. 1, a data input-output device for a camera comprises a data converting IC 3 comprising an input interface 4, a window comparator 5 and D flip-flops 8 and 9; a logic IC 13 comprising AND circuits 14 through 17, OR circuits 18 through 21 and AND gates 22 through 25; an output interface 27 comprising RS flip-flops 28 and 29; and a timing signal generator 30.

The input interface 4 of the data converting IC 3 is comprised of a PMOS transistor $Q_1$ and an NMOS transistor $Q_2$. A drain of the PMOS transistor $Q_1$ is connected to a power source terminal $V_{DD}$ and a source thereof is connected to a drain of the NMOS transistor $Q_2$ through resistors $R_3$ and $R_4$. A source of the NMOS transistor $Q_2$ is connected to a power ground terminal $V_{ss}$. The gates of the transistors $Q_1$ and $Q_2$ are connected to a pin $P_1$. A connecting or junction point of the resistors $R_3$ and $R_4$ is connected to a pin $P_0$, which is a data input port. The pin $P_0$ is connected to the connecting or junction point of resistors $R_1$ and $R_2$. A switch 1 is connected at one end to the resistor $R_1$ and at its other end to the power source terminal $V_{DD}$. A switch 2 is connected at one end to the resistor $R_2$ and at its other end to the power ground terminal $V_{ss}$. The resistance values of the resistors $R_1$ and $R_2$ are much smaller than those of the resistors $R_3$ and $R_4$.

The timing signal generator 30 outputs an input gate pulse $\phi_1$, starting pulse $\phi_2$, clock pulse $\phi_3$ and output gate pulse $\phi_4$ to the pins $P_1$ through $P_4$, respectively, and the PMOS transistor $Q_1$ and the NMOS transistor $Q_2$ of the input interface 4 operate to conduct current through their source-drain paths when the input gate pulse $\phi_1$ is at H level.

The window comparator 5 includes a pair of comparators 6 and 7. The positive (+) terminals of the comparators 6 and 7 are connected to the pin $P_0$ and the negative (−) terminals thereof are connected, respectively, to nodes of resistors $R_5$ and $R_6$ and resistors $R_6$ and $R_7$, the resistors being serially connected between the power source terminal $V_{DD}$ and the power ground terminal $V_{ss}$ through a starting switch $Q_3$. The starting switch $Q_3$ comprises an NMOS transistor having a gate connected to the pin $P_2$ and a source-drain path connected in series with the power ground terminal $V_{ss}$ and the resistor $R_7$. When the starting pulse $\phi_2$ is inputted to the gate of the switching transistor $Q_3$ via the pin $P_2$, the comparators 6 and 7 operate and output H or L level signals in accordance with the opening and closing states of the switches 1 and 2.

By such a construction, both of the outputs of the comparators 6 and 7 become H level when only the switch 1 is closed, and both of the outputs become L level when only the switch 2 is closed. When both switches 1 and 2 are closed, only the output of the comparator 7 becomes H level. When both switches 1 and 2 are opened, both comparators output either an H level or a L level signal, though in this case, the AND gates 22 through 25 do not become active, so that the pins $P_9$ and $P_{10}$ of the output interface 27 remain at L level. The outputs of the comparators 6 and 7 are connected respectively to terminals $J_1$ and $J_2$, to terminals $J_5$ and $J_6$ through inverters 10 and 11 and also to D terminals of the D flip-flops 8 and 9.

The Q terminal and $\overline{Q}$ terminal of the D flip-flops 8 and 9 are connected to terminals $J_3$, $J_4$, $J_7$ and $J_8$ as shown in FIG. 1 and both T terminals of the flip-flops are connected to the pin $P_3$. When a clock pulse $\phi_3$ is inputted to the pin $P_3$, the input data of the D flip-flops 8 and 9 are latched. At the time the input data are latched, if the outputs of the comparators 6 and 7 are at H level, the Q terminals of the D flip-flops 8 and 9 become H level. If the input data at the D terminals are L level, the Q terminals become L level.

The terminals $J_1$ through $J_8$ of the data converting IC 3 are connected to input terminals of the AND circuits 14 through 17 which have similarly numbered subscripts. Thus the terminals $J_1$ through $J_8$ are connected to the AND terminals of the logic IC 13 $A_1$ through $A_4$, $B_5$ through $B_8$, $C_1$, $C_2$, $C_7$, $C_8$, $D_2$, $D_4$, $D_5$ and $D_7$. The input AND terminals of the logic IC 13 comprise the input side of the AND circuits 14 through 17 by each block of A, B, C and D and the output of each of the AND circuits 14 through 17 becomes H level when all their inputs are at H level. As for the AND logic, when only the switch 1 is closed, both comparators 6 and 7 become H level and the AND circuit 14 becomes active or enabled, when only the switch 2 is closed, both comparators 6 and 7 become L level and the AND circuit 15 becomes active, and when both switches 1 and 2 are closed, only the comparator 7 outputs an H level signal and the AND circuit 17 becomes active. The AND logic of the AND circuits 15 and 16 is also used to reset the RS flip-flops 28 and 29.

The outputs of the AND circuits 14, 15, 16 and 17 are connected respectively to inputs of the OR circuits 18 and 21; 19 and 20; 19 and 21; and 18 and 20. The outputs of the OR circuits 18 through 21 are connected respectively to one of the inputs of the AND gates 22 through 25 and the other inputs of the AND gates are connected to the pin $P_4$. When the output gate pulse $\phi_4$ is inputted to the pin $P_4$, the RS flip-flops 28 and 29 operate according to the data stored in the D flip-flops 8 and 9. By the logic operation of the RS flip-flops 28 and 29, H and L level signals are outputted to the pins $P_9$ and $P_{10}$ when only the switch 1 is closed, L and H level signals are outputted to the pins when only the switch 2 is closed, H and H level signals are outputted to the pins when both switches 1 and 2 are closed, and L and L level signals are outputted when both the switches are opened.

Figure 2:
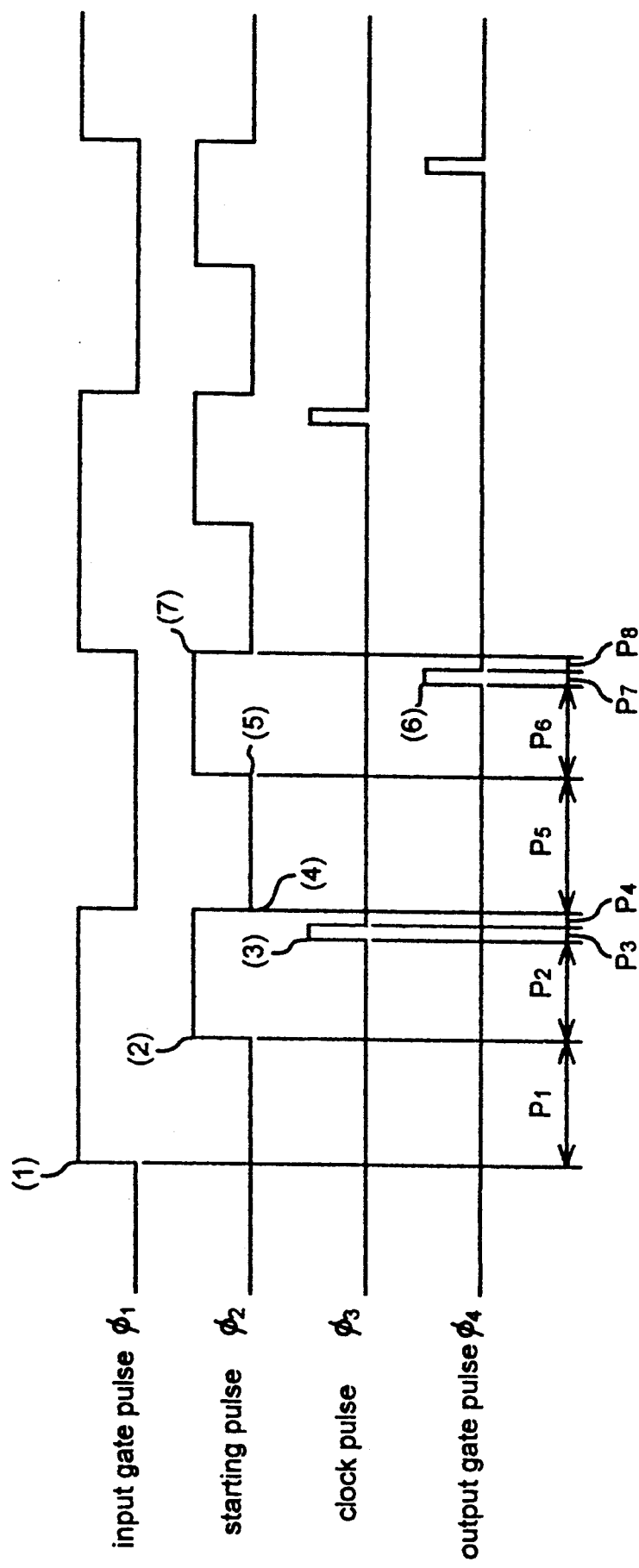
FIG. 2 is a timing chart for explaining the operation of the device shown in FIG. 1.

The overall operation of the data input-output device shown in FIG. 1 will next be described with reference to the timing chart in FIG. 2. When the switch 1 is closed, the NMOS transistor $Q_2$ becomes conductive and turns ON at point (1) (FIG. 2) due to the input gate pulse $\phi_1$. When the NMOS transistor $Q_2$ turns ON, a circuit is formed from the power source terminal $V_{DD}$, the resistors $R_1$ and $R_4$, the drain-source path of the transistor $Q_2$ and the power ground terminal $V_{ss}$ and an input data is sent out to the positive (+) terminals of the comparators 6 and 7. When the starting switch $Q_3$ is operated at point (2), a reference voltage is applied to the negative (−) terminals of the comparators 6 and 7, so that both comparators 6 and 7 operate. This operational state continues during the time periods $T_2$, $T_3$ and $T_4$ until point (4) where the starting pulse $\phi_2$ becomes L level, so that when a clock pulse $\phi_3$ is inputted to the D flip-flops 8 and 9 at time period $T_3$, the input data is latched in the D flip-flops 8 and 9 at point (3) which corresponds to the rising edge of the clock pulse $\phi_3$. The latched input data is determined by the signal level of the D terminals of the D flip-flops 8 and 9 at the time of the clock pulse $\phi_3$ and is output at the Q terminals of the flip-flops.

Next, during the time from point (5) to point (7) in which the input gate pulse $\phi_1$ is L level and the starting pulse $\phi_2$ is H level, the starting switch $Q_3$ turns ON and the comparators 6 and 7 again operate. When the comparators 6 and 7 operate, digital data (corresponding to true and false states) of four states of the output side of the comparators 6 and 7 and of four states of the L terminals of the D flip-flops 8 and 9 in which the input data was latched at point (3) are applied into the terminals $J_1$ through $J_8$. Thus a total of eight logic states are output from the terminals $J_1$ through $J_8$ of the data converting IC 3.

By way of example, in the state when the switch 1 is closed, both outputs of the comparators 6 and 7 are H level and both Q terminals of the D flip-flops 8 and 9 are H level among those 8 states, so that only the terminals $J_1$ through $J_4$ become H level. Due to that, only the output of the AND circuit 14 becomes H level and when one of the input sides of the AND gates 22 through 24 are caused to be H level at the rising edge of the output gate pulse $\phi_4$, only the AND gate 22 is enabled at point (6) and the pin $P_9$ becomes H level and the pin $P_{10}$ remains at L level. Although the pulse of the output gate pulse $\phi_4$ is not drawn in FIG. 2, this state of the pins $P_9$ and $P_{10}$ continues until the R terminal of the RS flip-flop 28 of the output interface 27 becomes H level by the output gate pulse $\phi_4$ when the OR circuit 19 becomes H level due to variation of the terminals $J_1$ through $J_8$. Whether the R terminals of the RS flip-flops 28 and 29 become H level or not is determined directly by the open/close state of the switches 1 and 2.

The conversion time for converting the input data to the output data is represented from point (1) through (7), and all of the data processing during that period is carried out by random logic. The logic IC 13 is structured in three stages of the AND circuits 14 through 17, OR circuits 18 through 21 and the AND gates 22 through 25, so that the output transition time is 150 nS, assuming that it takes 30 nS per one element, and is 200 nS considering that there exists a delay of 60 nS for the output gate pulse $\phi_4$ to the AND gates 22 through 25. The output transition time of the data converting IC 3 similarly becomes 1200 nS if the total of the rise and fall times of the comparators 6 and 7 is assumed to be 10 nS. Accordingly, the clock frequencies of the input gate pulse $\phi_1$, the starting pulse $\phi_2$, the clock pulse $\phi_3$ and the output gate pulse $\phi_4$ are the main factors in determining the conversion time, and the operation time of each element need not be considered. Therefore, if the clock frequencies are synchronized with each other, the conversion time will be 1 to 3 nS even if security of operation is taken into account, and it becomes possible to process input and output data at a higher speed than one command execution unit of program logic by a central processing unit (CPU) which contains various gate circuits, registers and operation circuits. Moreover, since only one input port $P_0$ exists, the data input-output device can be manufactured as an IC with a reduced number of pins.

The first and second switches 1 and 2 in the aforedescribed embodiment are not limited to mechanical contacts, and may be electrical, electronic, electromechanical or other type. The input data generating source may, for example, be light-receiving elements such as phototransistors and so forth, or a semiconductor, a piezoelectric element or a magnetic sensor of a sensor provided on a rotating member provided on a lens barrel of a camera.

As is understood from the preferred embodiment described above, a data input-output device for a camera of the present invention is comprised of first and second switches, first and second flip-flops for latching input data generated by opening and closing the first and second switches, data converting means for converting the input data to digital data by a combination of the input data generated by opening and closing the first and second switches and of the output data of the first and second flip-flops, a plurality of AND circuits in which the digital data converted by the data converting means is inputted, and data output means for outputting a plurality of digital data based on AND logic obtained by the plurality of AND circuits. The data input-output device is advantageous because it allows a decrease in the number of terminals when implemented as an IC, simplifies the pattern of a printed circuit board by its simple random logic and enables the circuit elements to be mounted in a high packaging density.

What is claimed is:

1. A data input-output device for a camera, comprising: first and second switches individually switchable to open and closed states to generate input data; means for determining the open and closed states of each of the first and second switches; first and second flip-flops for latching input data generated by opening and closing the first and second switches and outputting corresponding output data; data converting means for converting the input data generated by opening and closing the first and second switches to digital data by a combination of the input data generated by opening and closing the first and second switches and of the output data of the first and second flip-flops; a plurality of AND circuits connected to receive the digital data converted by the data converting means and perform AND logic operations thereon; and data output means for outputting a plurality of digital data from the AND logic operations obtained by the plurality of AND circuits.

2. A data input-output device, comprising: first and second switch means each switchable between two switching states to generate input data; means for determining the switching state of each of the first and second switch means; data converting means for converting the input data into two similar sets of digital data; and logic means for carrying out logic operations on the two sets of digital data to produce a plurality of digital output data representative of the switching states of the first and second switch means.

3. A data input-output device according to claim 2; wherein the data converting means includes means for sequentially producing the two sets of digital data, and means for temporarily storing the first set of digital data which is produced while the second set of digital data is produced.

4. A data input-output device according to claim 3; wherein the means for temporarily storing the first set of digital data comprises first and second flip-flops connected to receive and temporarily latch the first set of digital data.

5. A data input-output device according to claim 4; wherein the means for sequentially producing the two sets of digital data comprises first and second comparators operative when jointly enabled to produce a set of digital data representative of the switching states of the first and second switch means.

6. A data input-output device according to claim 5; further including means for sequentially jointly enabling the first and second comparators to sequentially produce the two sets of digital data.

7. A data input-output device according to claim 3; wherein the logic means includes a plurality of AND circuits having inputs connected to receive the two sets of digital data and perform AND logic operations thereon, and logic circuitry connected to outputs of the AND circuits for carrying out logic operations to produce the digital output data.

8. A data input-output device according to claim 7; wherein the AND circuits each have four inputs; and wherein the data converting means has eight output terminals connected in a predetermined pattern to the inputs of the AND circuits.

9. A data input-output device according to claim 8; wherein the data converting means has a single data input terminal connected to the first and second switch means to receive therefrom input data corresponding to the switching states of the first and second switch means.

10. A data input-output device according to claim 2; wherein the data converting means has a single data input terminal connected to the first and second switch means to receive therefrom input data corresponding to the switching states of the first and second switch means.

11. A data input-output device according to claim 1; wherein the means for determining the open and closed states of each of the first and second switches comprises a plurality of comparators.

12. A data input-output device according to claim 11; wherein the means for determining the open and closed states of each of the first and second switches further comprises a starting switch operative in response to a starting pulse to initiate operation of the comparators.

13. A data input-output device according to claim 12; wherein the starting switch comprises a transistor.

14. A data input-output device according to claim 11; wherein the means for determining the open and closed states of each of the first and second switches further comprises a data input interface comprising an NMOS transistor and a PMOS transistor.

15. A data input-output device according to claim 1; including a plurality of OR circuits connected to receive data outputted from at least some of the plurality of AND circuits which receive the digital data converted by the data converting means and operative to perform OR logic operations on the received data to obtain subsequent data.

16. A data input-output device according to claim 15; including another plurality of AND circuits connected to receive the subsequent data obtained from the logic operations performed by the plurality of OR circuits and operative to perform AND logic operations thereon to obtain final data to be provided to the data output means.

17. A data input-output device according to claim 16; wherein the data output means comprises a plurality of flip-flops connected to receive the final data obtained from the logic operations performed by the another plurality of AND circuits and operative to output a plurality of digital data.

18. A data input-output device according to claim 1; wherein the data output means comprises a plurality of flip-flops.

* * * * *